Dec. 1, 1959 W. B. BURNET ET AL 2,915,182
APPARATUS FOR GRADING GRAIN
Filed Sept. 7, 1955 3 Sheets-Sheet 1
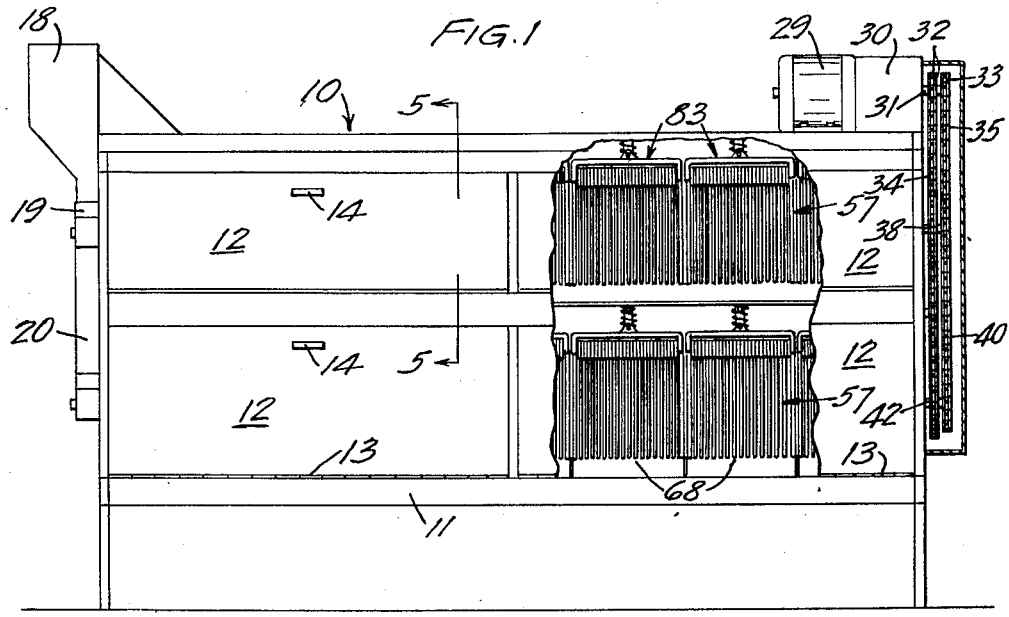
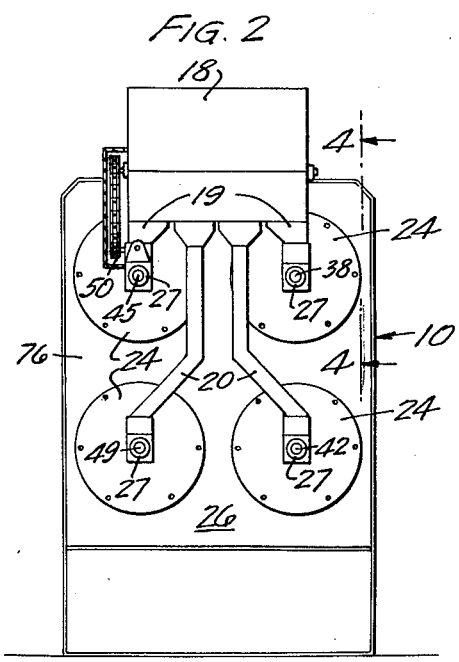 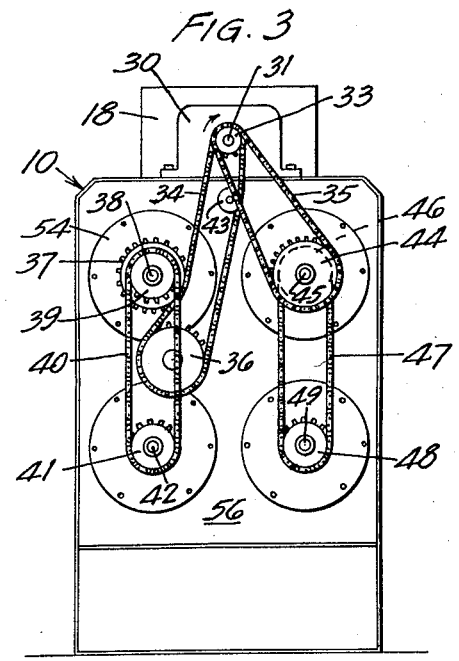
INVENTORS
WILLIAM B. BURNET
CARL R. ANDERSON
BY Williamson, Schroeder, Adams & Meyers
ATTORNEYS

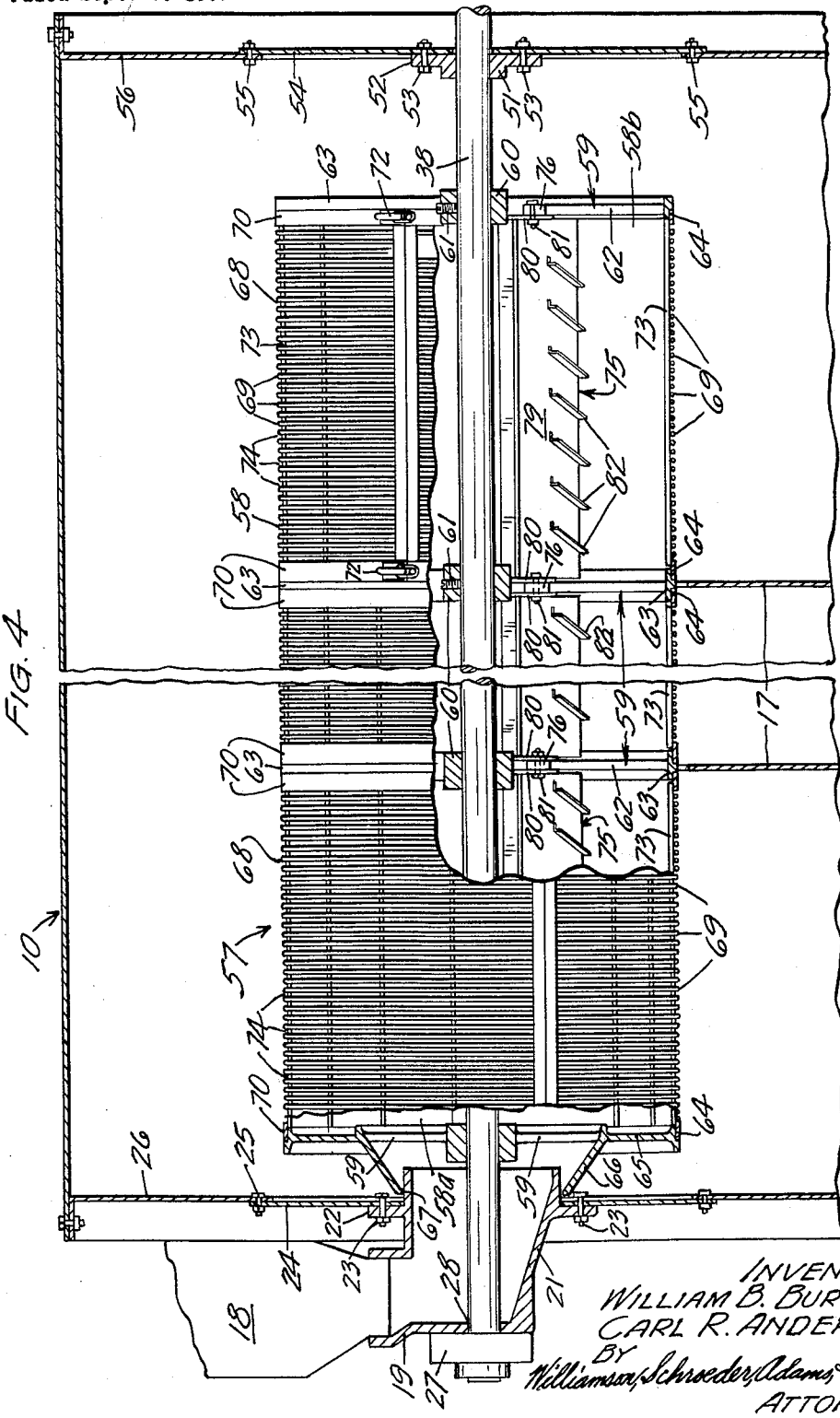

Dec. 1, 1959   W. B. BURNET ET AL   2,915,182
APPARATUS FOR GRADING GRAIN
Filed Sept. 7, 1955   3 Sheets-Sheet 3
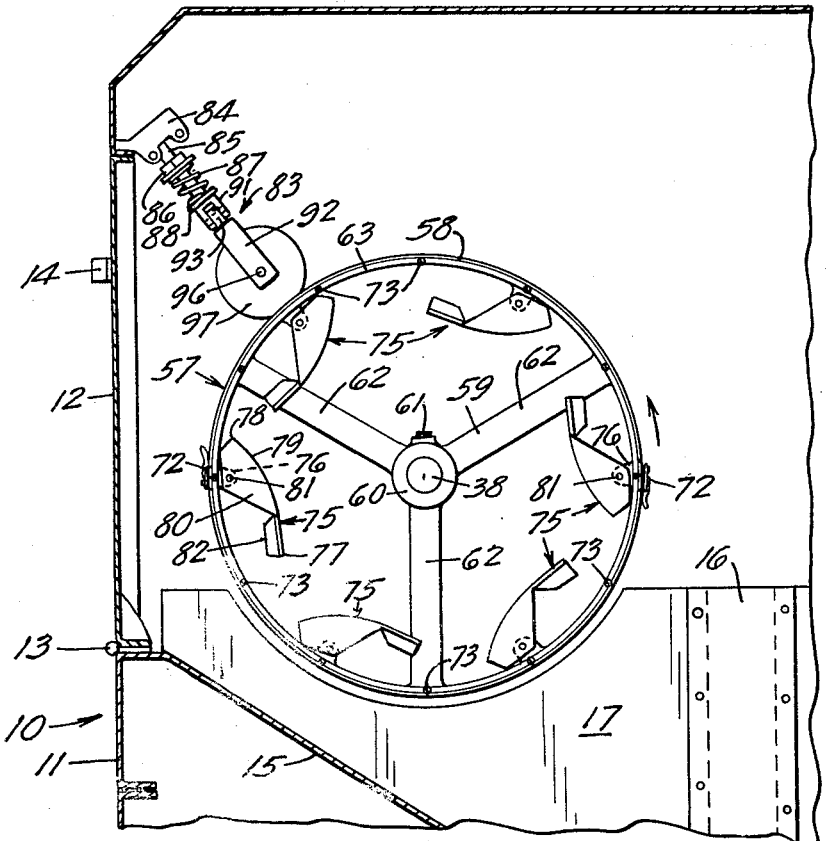
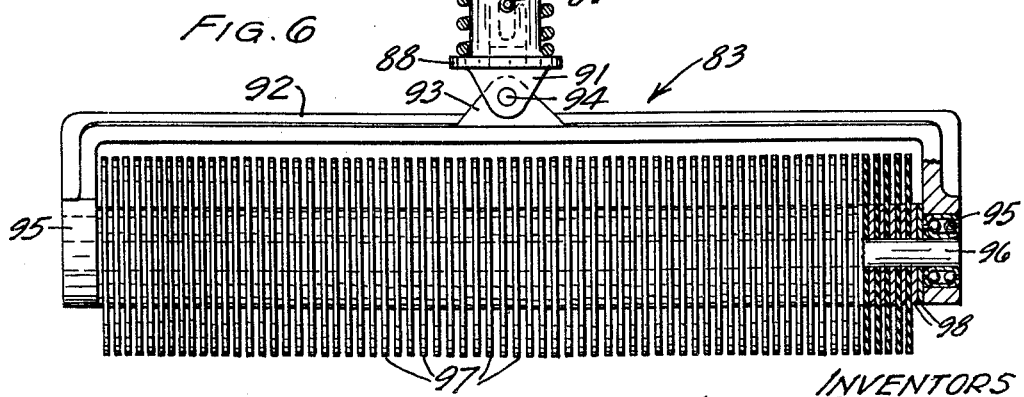
INVENTORS
WILLIAM B. BURNET
CARL R. ANDERSON
BY Williamson, Schroeder, Adams & Meyers
ATTORNEYS

United States Patent Office 2,915,182
Patented Dec. 1, 1959

2,915,182

APPARATUS FOR GRADING GRAIN

William B. Burnet, Minneapolis, and Carl R. Anderson, Hopkins, Minn., assignors to Superior Separator Company, Hopkins, Minn., a corporation of Delaware Application September 7, 1955, Serial No. 532,938

3 Claims. (Cl. 209—294)

This invention relates to apparatus for grading grain, and more particularly to an improvement in a rotary reel width grading machine for grains such as barley.

The grading of malting grains is made on the basis of the transverse width of the individual kernels irrespective of the length thereof, since it is the former that determines the bulk and character of the kernel. Small differences in width make for considerable differences in the grade of the grain and the malting industry is particularly concerned about sharp definition in the grading of barley.

We are aware of several machines which have been developed through the years which have utilized the width-grading principle. The more successful type of width graders employ cylindrical reels having bands of circumferentially disposed slots, each succeeding band from the feed end of the cylinder having uniformly wider slots to define a particular grade of grain according to its width characteristics. Each band has a receiver disposed below to catch its particularly classified portion of the grain. In a representative prior art device, flat bars are employed within the cylinder and arranged radially adjacent the inner periphery to agitate the grain as the cylinder rotates. The conventional width grader also has externally mounted rotary bristle brushes which lie in contact with the slotted areas and serve to poke back those grain kernels which have become lodged in the slots of a particular screen following which these kernels intermingle again with tumbling grain and find their way through the wider slots of the next succeeding band. The structural strength of the prior art devices with which we are familiar is gained through rigid cylindrical construction and relies upon the screen areas as well as the intervening cylindrical areas for its strength.

It is a general object of this invention to provide an improved reel width grader of gentle action which will produce a high capacity of finely-graded grain product and which can be easily and quickly adapted to various types and sizes of grains.

It is another object of the invention to provide a rotary reel width grader which will function in the classification of grain such as barley simultaneously over a large portion of the available grid-classifying area of the apparatus and will advance the grain uniformly and with a minimum of re-mixing to the next larger grid area.

It is a further object of the invention to provide a novel and inexpensive cleaning mechanism requiring no independent driving power which will aid in the efficient operation of our grading apparatus by effectively cleaning circumferential rod-type classifying grids for long periods of operation without requiring repair, replacement or special attention.

A still further object of the invention is to provide, in apparatus of the class described, a shaft-supporting cylinder frame upon which replaceable and interchangeable arcuate grid members can be externally mounted with each whenever it is desired to modify the classification system or to replace worn or damaged grid elements.

These and other objects and advantages of our invention will more fully appear from the following description made in connection with the accompanying drawings wherein like reference characters refer to the same parts throughout the several views and in which:

Figure 1 is a side elevation of our width grader apparatus, portions of the outer shell being cut away to better show the internal arrangement of parts;

Figure 2 is an end view of our apparatus taken from the feed end of the device at the left of Figure 1;

Figure 3 is an end view taken from the right of Figure 1 and with the gear housing having been removed;

Fig. 4 is an enlarged vertical section of one of the rotary reels taken on line 4—4 of Fig. 2 with portions of the reel broken away and the feed end also being broken away, reel spacings being exaggerated for clarity;

Fig. 5 is an enlarged vertical section of a segment of our apparatus taken on the line 5—5 of Figure 1; and Figure 6 is an enlarged detail view of our special cleaner element, portions of the element being cut away in vertical section for clarity.

With continued reference to the drawings, our apparatus has a housing indicated generally at 10 which is mounted upon and supported by a binned grain-receiving base 11, as shown in Fig. 1. In order to facilitate entrance to the internal portion of the housing, it is provided with panels 12 which are hingedly connected at 13 at each side of housing 10 and has handles 14 for swinging the panels inwardly and outwardly. Angulated bottom plates 15 are disposed at each side of the housing 10 and are pitched downwardly and inwardly to provide a chute for the grain after it has been graded. Spout structures 16 are disposed vertically in the housing 10 and compartments are formed lengthwise of the housing. Divider baffles 17 are interposed at spaced intervals along the housing and serve spout structures 16 to define receiving bins for the various grades of grain as they are delivered from the grading mechanism, all as shown in Figs. 4 and 5.

The feed or inlet end of the apparatus is shown at the left in Fig. 1 and is illustrated in end view in Fig. 2; a common feed hopper 18 is mounted at the inlet end of the apparatus and is provided with a feed duct 19 for each of the upper grading units and a feed duct 20 for each of the lower grading units. A feed spout 21 is secured to the lower end of each of the ducts and each is provided with a connecting flange 22 secured as by bolts 23 to access doorway 24 which, in turn, is secured as by bolts 25 to the wall 26 which is disposed at the inlet or feed end of the housing 10. It is understood that one or more grading units may be disposed within the housing 10 and that a duct and spout will be supplied for each such unit. In the instant case, four such grading units are employed with four spouts respectively feeding each of the units from the common hopper 18. Each of the feed ducts 19 has a bearing 27 secured at the outside thereof adjacent the spout 21 and each having its axis normal to the front wall 26 and aligned in registry with an opening 28 formed through the wall of the duct 19, as shown in Fig. 4. In the lower unit, the bearings 27 are disposed on the lower ends of the ducts 20, as shown in Fig. 2.

The opposite end of our apparatus has the drive mechanism as shown in Figs. 1 and 3. A motor 29 may be conveniently mounted at an upper position at the feed end of housing 10. A gear reduction unit 30 may be coupled therewith and supplied with a drive shaft 31 as shown in Fig. 3. The drive shaft 31 is provided with two pinions 32 and 33 which respectively drive the chains 34 and 35 as shown in Figs. 1 and 3. The chain 34 passes around the idler sprocket 36 and lies in driving contact with the sprocket 37 as shown in Fig. 3. The sprocket 37 is secured to shaft 38 which also bears the pinion 39. Pinion 39, in turn, is provided with a chain 40 which extends downwardly to pass around the sprocket 41, in turn secured to the shaft 42. Slack take-up 43 controls the tension on chain 34 during operation. Roller chain 35 drives the sprocket 44 which, in turn, is secured to the shaft 45. Shaft 45 also bears pinion 46 which connects the two-roller chain 47 to the sprocket 48, in turn drivably connected to shaft 49. Gear box 31 rotates in the direction of the arrow so that each of the shafts 45 and 49 at the right end side of the apparatus turn clockwise as viewed in Fig. 3. Each of the shafts 38 and 42 at the left hand side as viewed in Fig. 3 turn counter-clockwise. Mechanical means for agitating grain (not shown) may be included in the hopper 18 and interconnecting drive mechanism 50 may be supplied therefor, the power being taken off from one of the shafts as shown in Fig. 2. Each of the driven shafts is journaled in a bearing 51 which, in turn, is provided with a flange connection 52 bolted as at 53 to an access plate 54 which, in turn, is secured as by bolts 55 to the end wall 56 at the drive end of the apparatus as shown in Fig. 4.

To each of the shafts is secured a grain-grading unit indicated generally at 57 as shown in Fig. 4. In the particular detailed showing, the unit is secured to shaft 33. Each of the grading units 57 constitutes a rotary reel width grader having an elongated tubular body 58 with an inlet 58a at one end and the other end 58b being disposed adjacent the drive end 56 of the apparatus. The tubular body is disposed generally horizontal and is mounted to the shaft 38 by means of spaced circular grid supports or spiders 59, as shown in Figs. 4 and 5. Each of these circular grid supports has a hub member 60 secured against rotation by such means as a set screw 61 to shaft 38 and each of the hubs 60 having a plurality of spokes 62 extending radially outward in rigid interconnection to terminate in a circumferential rim 63. The annular rim 63 is provided with a recess or circumferential groove 64 at each side, the end supports, however, requiring only one of the circumferential recesses 64. The particular grid support 59 which lies closest to the inlet end 26 of the apparatus is supplied with an annular plate 65 and a frusto-conical shield 66, the outer edges 67 of which over-ride the spout 21, as shown in Fig. 4. The circular grid supports 59 are preferably spaced at an equal distance longitudinally of the shafts 38.

Tubular body 58 is also supplied with a plurality of grid-classifying members 68, each of which is mounted circumferentially of and consecutively along the tubular member from the inlet end thereof toward the drive end of the apparatus. Pairs of the grid-classifying members 68 are preferably mounted in substantially complete cylindrical form so as to present a maximum of screening or grading surface. The grid-classifying members 68 are arcuate in form and are composed of a series of circumferential rods 69 each having predetermined and equal spacing for each of the grid-classifying or screen members 68 and bounded at the side edges by arcuate margins or bands 70, as shown in Fig. 4. The arcuate grid members are disposed with their margins 70 in corresponding recessed grooves 64 of the circular grid support members. Several of the arcuate grid screens may be tightly secured together in their proper position against the circular grid support recesses or grooves to form a complete cylindrical screen unit and to define a plurality of screening zones. The respective ends of each of the grid members may be secured together by such means as snap buckles 72 which are conventionally employed for suitcases and the like.

It should be noted that when the arcuate grid screens are secured in position, they have little structural contribution to the overall tubular units since it is intended that the shaft 38 and internal bracing members supply the requisite structural strength. Removability and interchangeability is thus maintained in the individual grid-classifying members independently of the strength requirements of the tubular reel units. Arcuate grid screen members 68 may be supplied with a suitable number of cross rods 73 which are welded to the inner circumferences of each of the rod members 69 to form greatly elongated slots 74 therebetween.

An important part of our invention resides in means for more completely utilizing the screening area and for controlling the gradual flow of grain from the inlet and through the tubular body 58. Improved control is obtained by a plurality of elongated lifting and advancing elements 75, each of which is secured lengthwise of the tubular body 58, at lugs 76 which are secured to or formed with the inner circumference of the rim members 63. We have found that six of such lifting and advancing elements may be usefully employed in the proportion shown in Fig. 5. Each of the lifting and advancing elements 75 has a leading edge 77 and a trailing edge 78. The leading edge 77 is spaced at a greater distance from the inner periphery of rim 63 than is the trailing edge 78. The elements themselves may be constructed of elongated curved blades 79 to which laterally extending brackets 80 may be secured for attachment to the lugs 76 by such means as bolts 81. In order to obtain a uniform forward movement with a minimum of agitation of the grain within the tubular body, we provide a series of upstanding vanes 82 which are secured in spaced and angulated relation with the outwardly facing area of blade 79 so that a clearance exists between the screens and vanes. By referring to the direction of rotation as indicated by the arrow in Fig. 5, it will be noted that the leading edge 77 and the upstanding vanes 82 will first engage the grain as it lies in the lower portion of the tubular members 58.

Another important feature of our invention lies in the roller cleaner elements indicated generally at 83 in Fig. 5, and shown in enlarged detail in Fig. 6. Because of the increased area which is simultaneously utilized for grading and screening particles, there is a greater tendency for grain kernels to become lodged between the rods of the screens. Hence, we require a particularly efficient cleaning mechanism to maintain the grid free and clear from lodged kernels of grain at all time. In the course of experimenting with resilient solid rollers in conjunction with the circumferential rod-type grid screens, it was observed that particular efficiency was gained at the contiguous ends of the resilient rollers. Further experimentation proved that shortening the contiguous rollers to the point where they constituted resilient discs produced superior results with a long period of wear. The cleaner 83 comprises a bracket mount 84 which is secured to the inside of housing 10 and rigidly holds a shaft 85 in downwardly and inwardly angulated relation with respect to the tubular body 58, as shown in Fig. 5. Shaft 85 has a stop collar 86 secured therearound and adapted to bear against a compression spring 87 which, in turn, is compressibly engaged with a flanged collar 88, as shown in Fig. 6. Collar 88 is slidably received by shaft 85 and has a cross pin 89 shiftably lying within slot 90 formed toward the lower end of the shaft 85, as shown in Fig. 6. Collar 88 has an outwardly extending pivot bracket 91 to which is pivotally secured a yoke 92 at a central bracket 93 and by means of pivot pin 94. The yoke 92 is provided with ball bearing members 95 at each end thereof which rotatably hold shaft 96 therebetween. The shaft 96 is provided with a multiplicity of resilient discs or wafers 97 each separated by a thin spacer member 98 and rigidly secured to shaft 96 to form a roller unit. The axis of shaft 96 is in generally parallel alignment with shaft 38 which supports the tubular body 58, as shown in Fig. 5. Each grid screen unit 68 supported between an adjacent pair of circular grid supports 59 is supplied with a roller cleaner element 83. Whenever it is desired to remove the grid screen, the roller cleaner may be retracted and temporarily removed.

Operation

In the use and operation of our apparatus, the motor 29 is energized so as to cause all of the shafts 38, 42, 45 and 49 to rotate as previously indicated, the tubular reel bodies 58 which are secured to shafts 45 and 49 rotating in a clockwise direction while the corresponding tubular bodies 58 which are secured to shafts 38 and 42 will rotate in a counter-clockwise direction. Grain such as barley is fed through the duct 19 from hopper 18 and passes through the spout 21 and past the frusto-conical shield 66 into the cylindrical reel or tubular body 58 and it is first subjected to grading in the grid screen 68 nearest the inlet end of the device. In the use of our machine for barley grading, circumferential rods 69 are spaced a shorter distance in this first grid screen so as to permit passage of only the smallest of the barley kernels. The lifting and advancing members 75 will dip into the grain with their leading edges 77 and the angulated vanes 82, because of their angulation toward the leading blade edge 77 and rearward disposition with respect to the direction of advance of the grain, will cause the grain to slowly work forwardly from the inlet to the drive end of the apparatus. Each of the blades 79 scoops up a portion of the grain as it passes the lowest point in its circumferential travel and will cause grain to dribble over the trailing edge and to contact the grid screen up to a position substantially level with that of shaft 38. A certain portion of the grain will be retained upon the inner curved surface of the blade 79 and this will be carried over the highest position and downwardly to the other side. As the blade tilts downwardly in its travel, the grain will be caused to dribble upon and contact the grid screen at a position about level with the shaft 38 and opposed to the first mentioned level position. The action of the lifter members is such as to cause grain to be screened to substantially 180 degrees of screening surface. The grain is handled very gently and the multiplicity of vane members 82 prevents undue mixing of the grain which has already been subjected to one of the screening operations. The grain then continuously advances to the next segment of the cylindrical body and is again screened to another screen grid 68 having its circumferential rods 69 spaced slightly greater than the preceding screen. Kernels which pass through the second grid are prevented from intermingling with those passing through the first because of the baffle 17 which is coincident with the grid support separating the screens. Since the slots or spaces 74 are greatly elongated, grain kernels such as barley tend to lie longitudinally in the slot. If the fattest portion of the kernel will pass through the screen, then it is properly sized at that position. If it will not pass, then it goes to the next screen and so on until it finally reaches the slots 74 which are properly arranged to receive the kernel in question. A certain portion of the kernels will become lodged between the individual rods 69 and for that reason must be removed before they reduce the efficiency of the screening operation. It has been shown that it is advisable to force the kernels back in the opposite direction from which they came rather than to force them outwardly through the bars. The latter practice may tend to destroy the delicate spacing between the rods or bars of the grid.

Although a conventional powered rotary bristle brush will work well in removing lodged grain kernels, we have found that these brushes are rather costly and wear very rapidly. Our novel roller device is so constructed that the resilient discs or wafers 97 in rolling contact with each grid screen will weave in and out from between the circumferential bars and will give a gentle prying action to any kernels of grain which may be lodged between these bars. The pressure of the compression spring 87 is such as to cause the outer edges of each of the discs 97 to become slightly scalloped during operation. This pressure and scalloping action causes the weaving of the discs during their turning movement. The outer edges of the disc, thus presented at random to the slots 74 between rods or bars 69, effect practically 100% removal of lodged kernels while wearing for an indefinite period of time. In order to distribute the pressure and permit freedom of random movement of each of the discs 97 across the width of the roller, we have provided a floating mount which will equalize the pressure at these sides and, at the same time, provide freedom of movement of the discs in their rolling and weaving back and forth across the grid rods 69 and the slots 74 between them.

We have found that, with the particular elements disclosed herein, the efficiency of our reel width grader is approximately 50% greater than that of conventional graders presenting the same screening area with other factors remaining the same. Test samples for accuracy of kernel width show that the classified product of the instant invention is at least comparable with that of prior art devices.

It will, of course, be understood that various changes may be made in the form, arrangement and proportion of the parts without departing from the scope of our invention.

What we claim is:

1. In a rotary reel width grader for classifying grain such as barley, an elongated axial shaft journalled at widely separated positions, a series of longitudinally spaced circular grid supports each having radial spokes secured to said shaft for structural and operative strength, a plurality of cylindrical grid screens defining a plurality of screening zones each screen having spaced side edges adapted to engage respectively each pair of adjacent spaced circular grid supports, each of said grid screens being constructed of parallel circumferential rods of predetermined longitudinal spacing defining continuous circumferential slots, and a plurality of cleaner roller elements each cooperating with one of said screening zones, each of said roller elements having a multiplicity of resilient discs mounted in axial alignment of a roller shaft, said roller shaft of each cleaning shaft being journalled on a floating mount, said resilient discs of each roller element having peripheral edges penetrating slots of its respective screening zone and means urging the discs of each of said roller elements towards its respective screening zone whereby to effectively dislodge wedged grain kernels from said slots.

2. A rotary reel, kernel-width grader for classifying barley and the like, having in combination an elongated, generally tubular rotary body mounted on a substantially horizontal axis and having a generally axial inlet at one end thereof, said tubular body including a plurality of cylindrical grid screens each having side edges detachably secured to the respective side edges of each adjacent screen, said grid screens including a multiplicity of narrowly spaced, kernel-width classifying grid rings, each adjacent pair of rings defining substantially continuous circumferential classifying slots, a plurality of elongated lifting and advancing blades secured longitudinally to the interior of tubular body and each having an elongated continuous trailing edge disposed in close proximation to the inner circumference of said body and each having an elongated, continuous leading edge disposed a greater distance from the inner circumference of said body than the trailing edge, said blades in cross-section being substantially arcuate in shape and being adapted to pick up grain from the bottom portion of said tubular body over the leading edge thereof and lifting and dribbling the grain over the trailing edge thereof into contact with a substantial continuous longitudinal inside area of the tubular body for rapid width grading of said grain, a plurality of vanes mounted in upstanding relation adjacent the leading edge of said blades and extending toward the inner circumference of said body in acutely angled relation to parallel planes to which the axis of said body extends normal, whereby grain into the inlet end of said tubular body will be slowly and orderly advanced towards the opposite end of said body as the individual kernels are lifted up and applied against said grid screens.

3. In a rotary reel width grader for classifying grain such as barley an elongated axial shaft journalled at widely separated positions, a series of longitudinally spaced circular grid supports each having radial spokes secured to said shaft, a plurality of cylindrical grid screens defining a plurality of screening zones each screen having spaced side edges adapted to engage respectively each pair of adjacent spaced circular grid supports, each of said grid screens being constructed of parallel circumferential rods of predetermined longitudinal spacing defining continuous circumferential slots, and a plurality of cleaner roller elements each cooperating with one of said screening zones, each of said roller elements having a multiplicity of resilient discs mounted in axial alignment of a roller shaft, said resilient disc of each roller element having peripheral edges penetrating slots of its respective screening zone and means urging the disc of each of said roller elements toward its respective screening zone whereby to effectively dislodge wedged grain kernels from said slots, a plurality of elongated lifting and advancing blades secured longitudinally to the interior of the cylindrical grid screens and each having an elongated continuous trailing edge disposed in close proximation to the inner circumference of said grid screens and each having an elongated continuous leading edge spaced a greater distance from the inner circumference of said grid screen than the trailing edge and being adapted to pick up grain over the leading edge and lifting and dribbling the grain over the trailing edge thereof into contact with a substantial continuous longitudinal inside area of the grid screen opposite the slot penetrating peripheral edges of the discs of said roller element.

References Cited in the file of this patent

UNITED STATES PATENTS

| | | |
|---|---|---|
| 316,179 | Richards | Apr. 21, 1885 |
| 501,898 | Schupp | July 18, 1893 |
| 1,689,972 | Rothgarn | Oct. 30, 1928 |
| 1,948,606 | Weinig | Feb. 27, 1934 |
| 2,173,314 | Rylander | Sept. 19, 1939 |

FOREIGN PATENTS

| | | |
|---|---|---|
| 19,684 | Germany | Oct. 13, 1882 |
| 484,172 | Germany | Oct. 11, 1929 |